INVENTORS:
JAMES V. O'HERN,
HANS R. SCHINDLER,
BY Marvin G. Goldenberg
THEIR ATTORNEY.

INVENTORS:
JAMES V. O'HERN,
HANS R. SCHINDLER,
BY Marvin D. Goldenberg
THEIR ATTORNEY.

United States Patent Office 3,325,750

Patented June 13, 1967

3,325,750

HIGH RESOLUTION TIME INTERVAL MEASURING CIRCUIT EMPLOYING A BALANCED CRYSTAL OSCILLATOR

James V. O'Hern, Nedrow, and Hans R. Schindler, Syracuse, N.Y., assignors to General Electric Company, a corporation of New York Filed Dec. 23, 1963, Ser. No. 332,615

4 Claims. (Cl. 331—166)

This invention relates to high resolution time interval measuring circuits for measuring to a high degree of accuracy the time interval between pulses occurring at two successive points in time. The invention relates more particularly to a novel avalanche transistor triggered balanced crystal oscillator which generates a high frequency alternating voltage of constant amplitude and frequency for use in a measuring circuit of the above type employing solid state components, which circuit is highly stable, lightweight, small in size and of low power requirements.

A time interval measuring circuit of the counting type using a vernier arrangement of two oscillators displaced in frequency by a small fraction is disclosed in a textbook by Millman and Taub, entitled "Pulse and Digital Circuits," published by McGraw-Hill Book Company, Inc., on pages 508 through 513. An improvement in time resolution of several orders of magnitude can be provided by the vernier arrangement over counting circuits employing a single oscillator. The referenced circuit employs vacuum tubes and operates at relatively low frequencies. The circuit is therefore not entirely satisfactory for many present day circuit applications requiring compact, lightweight and low power apparatus as well as exceedingly high time resolution, e.g., on the order of a nanosecond.

One specific application of interest is with respect to laser ranging devices for computing short range targets, e.g., within sixty miles, where target range resolution of one foot and less is desired. The present invention appreciably advances the existing circuitry of the above described type and is particularly useful for laser ranging applications as well as other applications in the computer art where high resolution, high stability time interval measurements are required.

It is accordingly an object of the present invention to provide a novel time interval measuring circuit that is compact, lightweight, requiring small amounts of power and which has high resolution and high stability characteristics.

It is another object of the present invention to provide a time interval measuring circuit of the above described type which provides a time resolution of on the order of a nanosecond and which therefore has useful application to compact ranging apparatus for measuring range to within a ten centimeter resolution.

It is a further object of the present invention to provide a novel solid state, high resolution time interval measuring circuit of the vernier counting type which employs high frequency piezoelectric crystal components in the oscillatory circuits.

It is a more specific object of the present invention to provide a time interval measuring circuit of the type above described which employs novel piezoelectric crystal oscillating circuitry wherein the crystal components thereof are caused to commence ringing at essentially maximum amplitude.

It is a further more specific object of the present invention to provide a time interval measuring circuit of the above described type which employs a novel coincidence detection circuit for accurately detecting the time coincidence between two high frequency alternating waveforms closely related in frequency.

The above and other objects of the invention are accomplished in a time interval measuring circuit in which the interval between a first and second pulse occurring at successive points in time is accurately measured. A common transmission path is employed for receiving said pulses and providing corresponding square shaped pulses referenced in time to the received pulses, said path being coupled to a bistable network having two discrete voltage states. In response to the first shaped pulse, the bistable network switches to one state and the output thereof is employed to trigger a first clock generator network of resonant frequency $f_1$. Said clock generator network includes a piezoelectric crystal impulse shocked by an avalanche transistor so as to provide an alternating waveform output of essentially constant amplitude and constant frequency, the crystal being connected in a balanced circuit for balancing out transient response in said output waveform. The output of said first clock generator network is coupled to a first counter network which counts the cycles of said alternating waveform. In response to the succeeding second shaped pulse, the bistable network switches to its other state and the output thereof is employed to trigger a second clock generator network essentially identical to said first clock generator network but having a resonant frequency $f_2$ which is slightly displaced from $f_1$. The output waveform of said second clock generator network is coupled to a second counter network which counts the cycles thereof. The alternating waveforms outputs from said first and second clock generator networks are further coupled to a coincidence detection network for detecting the time of coincidence between said two waveforms. The coincidence detector derives a first and second train of narrow pulses referenced in time, respectively, to the two alternating waveforms from said first and second clock generator networks, generating an output step voltage upon a time coincidence of said pulse trains.

In one mode of operation, the output of said bistable network when in its other state is also employed to terminate the count of said first counter, and the output step voltage from the coincidence detection network is employed to terminate the count of said second counter. Accordingly, the counts registered in said first and second counters provide a measure of the time interval between said first and second pulses with a time resolution equal to the difference between the periods of the first and second clock generator networks.

While the specification concludes with claims particularly pointing out and distinctly claiming the invention, it is believed that the invention will be better understood from the following description taken in connection with the accompanying drawings in which:

Figure 1:
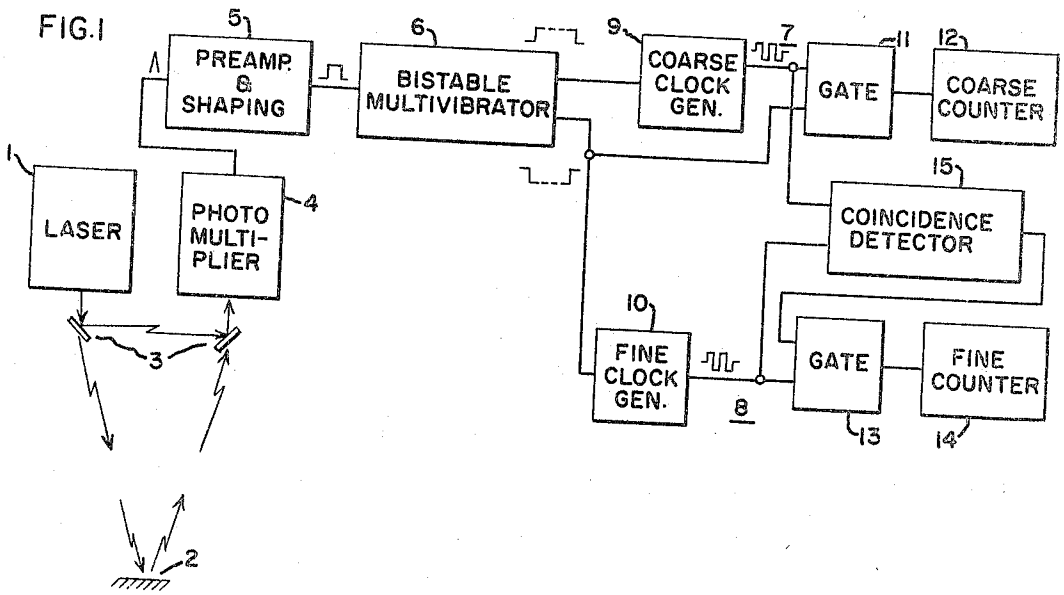
FIGURE 1 is a block diagram of a time interval measuring circuit in accordance with the invention.

Referring to FIGURE 1, there is illustrated a block diagram of a high resolution time interval measuring circuit, in accordance with the invention. The measuring instrument is shown to be employed, although not by way of limitation, for accurately measuring the interval between transmitted energy bursts from a laser device 1 and associated reflected signals from a target 2 in space. The illustrated circuitry is capable of readily providing a time resoultion on the order of a nanosecond and a corresponding target range resolution on the order of ten centimeters.

Typically, the laser transmitted pulse width is on the order of less than thirty nanoseconds so that short range targets can be computed. A small portion of the transmitted energy from laser device 1 is optically coupled by means of a conventional beam splitting arrangement 3 to a photomultiplier tube 4 which transforms the input radiant energy into a corresponding pulsed electrical signal at its output. In addition, after some interval of time corresponding to the range of target 2, and echo signal is received which is also coupled to the photomultiplier tube 4. The photomultiplier tube 4 is connected to a preamplifier and shaping network 5 which provides an output pulse of appropriate shape and amplitude for actuating the succeding circuitry. The preamplifier and shaping network 5 is shown in greater detail in FIGURE 3, which will be considered presently.

Figure 5:
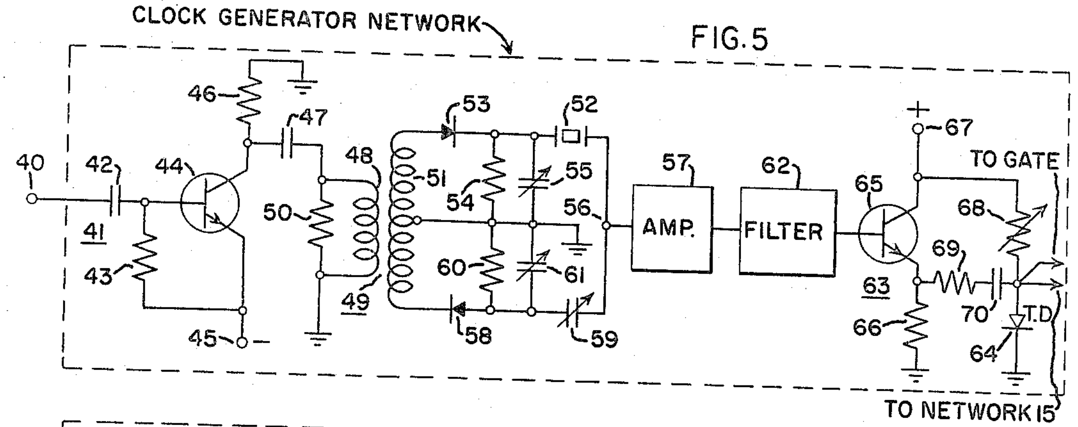
FIGURE 5 is a schematic diagram of a clock generator network employed in FIGURE 1.

The output pulse from network 5 is a relatively wide pulse having a leading edge referenced in time to the input pulse from which it is derived. It may be appreciated that, although only one pulse is being referred to, in practice there are processed two successive pulses for every measurement that is made. The output of network 5 is coupled to a bistable multivibrator or flip-flop network 6, which is a conventional transistor network having first and second outputs. The first output is coupled to a coarse counting channel 7 and the second output is coupled to a fine counting channel 8. In response to an input pulse to network 6 derived from a transmitted energy burst, a positive going step voltage appears at the first output and a negative going step voltage appears at the second output. In response to a succeeding input pulse derived from the reflected signal, the outputs from network 6 are inverted and a negative going step voltage appears at the first output and a positive going step voltage appears at the second output. The first output from network 6 is connected to the input of a coarse clock generator 9 of coarse channel 7. The second output from flip-flop network 6 is connected to the input of a fine clock generator 10 of fine channel 8. Generators 9 and 10 are essentially identical in their circuit configuration, being different only in that their frequencies are slightly offset, the offset being typically 1%. A detailed schematic circuit of a clock generator network which may be employed in either the coarse or fine channel is shown in FIGURE 5.

Figure 6:
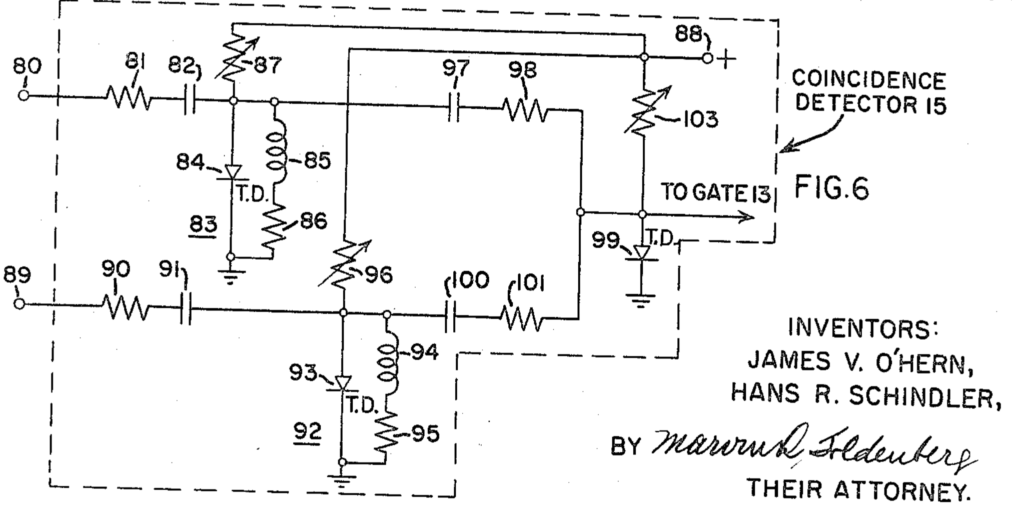
FIGURE 6 is a schematic diagram of the coincidence detector network of FIGURE 1.

The output from coarse clock generator 9, which is an A.C. rectangular waveform, is coupled through a gate 11 to a coarse counter 12 which counts the number of cycles generated by said coarse clock generator. Correspondingly, the A.C. rectangular waveform output of fine clock generator 10 is coupled through a gate 13 to a fine counter 14 which counts the cycles generated by the fine clock generator. The second output from flip-flop network 6, in addition to being coupled to fine clock generator 10, is applied as a control signal to gate 11 for inhibiting same. The outputs from coarse and fine clock generators 9 and 10 are also applied as first and second inputs to a coincidence detector network 15 which compares the phase of said outputs and upon a phase coincidence thereof generates an output step voltage which is fed back as a control signal to gate 13 for providing an inhibiting function. A detailed schematic circuit of coincidence gate 15 is illustrated in FIGURE 6, which will be considered presently.

Figure 2:
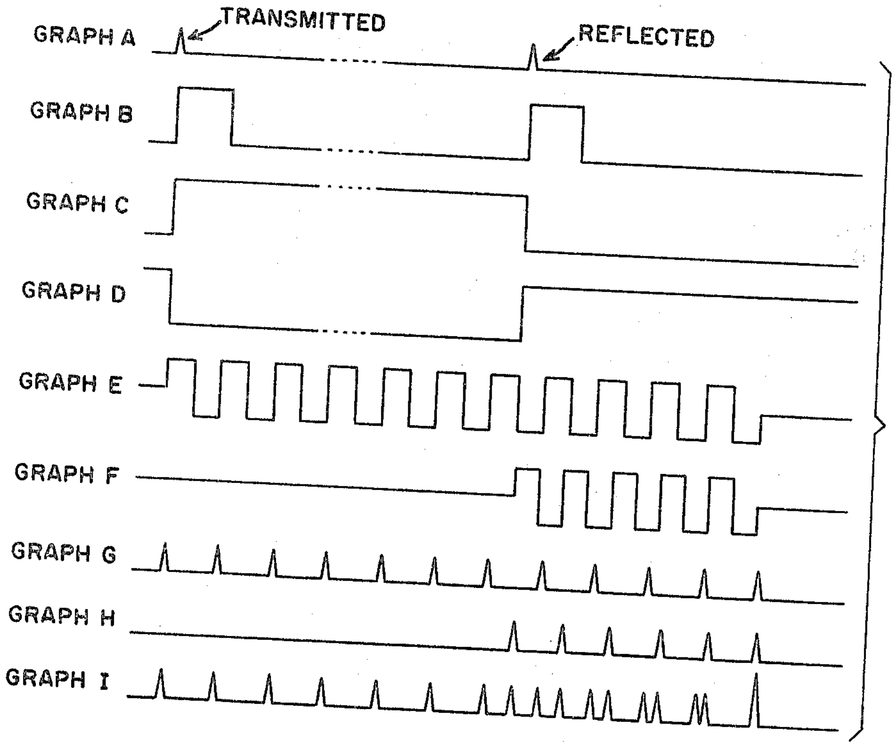
FIGURE 2 is a timing graph of various waveforms useful in the description of FIGURE 1.

In the operation of the time interval measuring circuit of FIGURE 1 a portion of the transmitted radiant energy burst, upon being coupled to photomultiplier tube 4, is transformed into an electrical pulse which is coupled to preamplifier and shaping network 5. This pulse is shown in Graph A of FIGURE 2. An amplified and shaped, relatively wide electrical pulse appears at the output of network 5, the leading edge of which is referenced in time to the occurrence of the transmitted pulse, shown in Graph B of FIGURE 2. The electrical pulse of Graph B is applied to the flip-flop network 6 and triggers said network into a first condition wherein a positive going step voltage appears at the first output, shown in Graph C, and negative going step voltage appears at the second output, shown in Graph D. The positive going step at the first output triggers the coarse clock generator 9 into oscillation, providing a rectangular waveform output of frequency $f_1$, as shown in Graph E. The circuit biasing is such that the negative going step at the second output cannot trigger fine clock generator 10. The rectangular wave output from generator 9 is transmitted through the gate 11, which is in a normally open state, to the coarse counter 12 and the cycles thereof are counted.

At some point in time subsequent to the time of the transmitted energy burst, a radiant energy pulse reflected from the target 2 is received, converted into an electrical pulse by photomultiplier 4 and applied to preamplifier and shaping network 5. This electrical pulse is shown in Graph A. Accordingly, a succeeding amplified and shaped electrical pulse, shown in Graph B, appears at the output of network 5 and is coupled to flip-flop network 6 for switching its operating state. A negative going step voltage, shown in Graph C, appears at the first output of network 6, and a positive going step voltage, shown in Graph D, appears at the second output. The negative going step applied to coarse clock generator 9 has no effect and oscillations continue therein. The positive going step applied to fine clock generator 10 triggers this generator into oscillation and a rectangular waveform output is provided having a frequency $f_2$, wherein typically $f_2=1.01f_1$. The rectangular waveform output from generator 10 is shown in Graph F. In addition, this positive going step is applied to gate 11 to inhibit this gate and terminate the count of the coarse counter 12. The output from fine clock generator 10 is transmitted through gate 13, in a normally open condition, to a fine counter 14 wherein the cycles are counted.

The rectangular wave form outputs of coarse and fine clock generators 9 and 10 are also coupled to coincidence detector network 15, which provides an output step wave only when the inputs thereto are in a time or phase coincidence. In coincidence detector 15 each of the rectangular waveforms is transformed into a train of narrow pulses, each pulse having a width which is on the order of the difference in periods of the two clock generating networks. The narrow pulses are referenced to each cycle of the rectangular waveforms, e.g., to the positive going edges of the said waveforms. The pulse train derived from the output of coarse clock generator 9 is shown Graph G; the pulse train derived from the output of fine clock generator 10 is shown in Graph H; and the composite of these pulse trains is illustrated in Graph I. It is seen that with only coarse clock generator 9 energized only a single train of pulses of frequency $f_1$ is active in coincidence detector 15. Energization of fine clock generator 10 produces a second train of pulses in detector 15 of frequency $f_2$. The amplitude of these pulses individually is insufficient to trigger detector 15. The second pulse train will commence at a point in time intermediate the pulses of the first train if the reflected signal pulse is received at a time other than coincident with the oscillations of coarse generator 9. The fractional time intermediate two adjacent pulses of the first pulse train in which initiation of the second pulse train occurs, which is that fractional time between counts of the coarse generator when the reflected pulse is received, is precisely determined by the oscillations of the fine clock generator 10. Thus, the number of cycles it takes the fine clock generator to count before the phase of the pulses of the first and second pulse trains coincide provides a vernier measurement of the indicated fractional time. At the time of coincidence the threshold of the coincidence detector is exceeded and an output step voltage is generated. The output generated from coincidence detector 15 is fed back to inhibit gate 13 and thereby terminate the count of fine counter 14. The counts now appearing in coarse counter 12 and fine counter 14 provide an accurate measure of the time interval between the transmitted and reflected pulses, and therefore an accurate measure of target range in the described application.

Resetting of the various networks of the circuit to an initial condition after performing a given measurement is normally necessary and may be readily done either electronically or mechanically by conventional techniques.

In one operating embodiment of the invention the frequency $f_1$ of coarse clock generator 9 was 5 megacycles; the frequency $f_2$ of fine clock generator 10 was 5.05 megacycles; the time resolution was two nanoseconds and the target range resolution was one foot. The count of coarse counter 12 was in units of one hundred feet of target range and the count of fine counter 14 was in units of one foot. If for purposes of illustration there is assumed a target range of 13,056 feet, it will be appreciated that a count of 130 will appear on coarse counter 12 and a count of 56 will appear on fine counter 14.

It is noted with respect to the embodiment illustrated in FIGURE 1 that a measurement of target range may be obtained from a direct reading of the coarse and fine counters. However, although having this advantage the circuit is subject to an error of unity in the coarse count if the echo pulse occurs approximately in time coincidence with the oscillations of the coarse clock generator, the error being due to inherent time delays within the system. Thus, in the indicated operating embodiment there may be an error in the coarse count for counts on the fine counter of 1 to 99. This may be ascertained by taking a subsequent measurement at a slightly different range. The circuit may also be modified so as to obviate the above noted error. In one such modification no connection is made from the bistable multivibrator circuit 6 output to gate 11 for terminating the coarse count upon reception of the echo pulse and the coarse counter is allowed to count until coincidence occurs in the coincidence detector network 15. The output from network 15 is then employed to inhibit both gates 11 and 13 to simultaneously terminate counts in counters 12 and 14. In this case, to obtain a reading of target range, the number of coarse counts is first reduced by the number in the fine counter and the reduced count combined with the count of the fine counter obtains the desired measurement.

Figure 3:
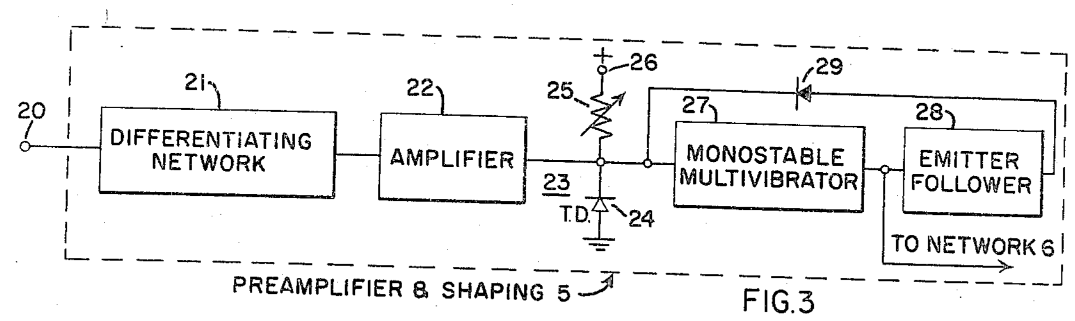
FIGURE 3 is a schematic block diagram of the preamplifier and shaping network of FIGURE 1.

With reference now to the schematic block diagram of the preamplifier and shaping network 5 shown in FIGURE 3, the output from photomultiplier tube 4 of FIGURE 1 is coupled to input terminal 20 of the network 5. Terminal 20 is connected by a differentiating network 21 to a transistor amplifier network 22, both shown in block form. Network 51 may be a conventional capacitance-resistance differentiator and network 52 may be a conventional linear amplifier. The output of amplifier 22 is connected to a tunnel diode threshold detector network 23 which includes tunnel diode 24, variable biasing resistor 25 and positive voltage source 26. Coupling of amplifier 22 is to the cathode electrode of tunnel diode 24, the anode and electrode being connected to ground. The cathode electrode is also coupled through variable biasing resistor 25 to source 26. The output of threshold detector 23 is taken from the cathode electrode of tunnel diode 24 and is coupled to a transistor monostable multivibrator 27, which is of a conventional type and shown in block form. The output of monostable multivibrator 27 is coupled to flip-flop network 6 of FIGURE 1. In addition, the output from monostable multivibrator 27 is coupled through a conventional emitter follower network 28 and a diode 29 back to the tunnel diode threshold detector 23 for resetting tunnel diode 24. Diode 29 is connected between the output of emitter follower network 28 and the cathode electrode of tunnel diode 24 and is poled to conduct current towards said cathode.

Figure 4:
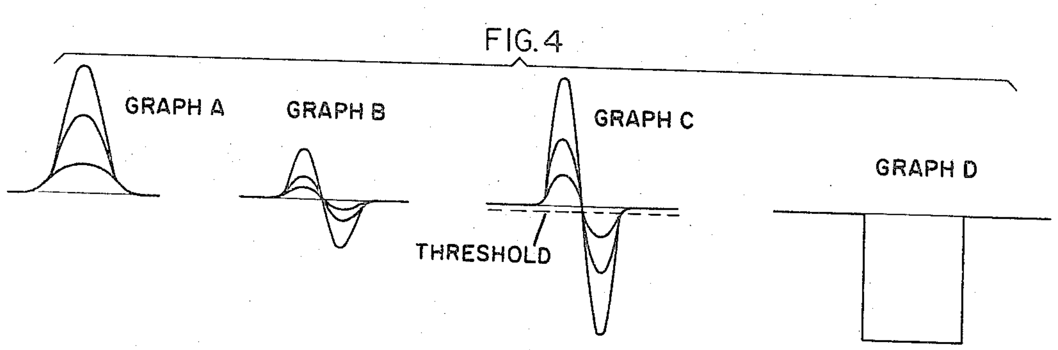
FIGURE 4 is a timing graph of waveforms occurring at various points in the circuitry of FIGURE 3.

In the operation of the circuit of FIGURE 3, a pulse from the photomultiplier network 4 such as depicted in Graph A of FIGURE 4, is differentiated in network 51, providing a waveform as shown in Graph B of FIGURE 4. These waveforms are shown with varying amplitudes which in practice is often the case with respect to reflected signal pulses. It is noted that the differentiated waveform at the output of the network 21 has a zero crossing point which corresponds to the center peak point of the input pulse to the network. It is also seen that as the amplitude of the input pulse varies, the center crossing point of the differentiated waveform remains constant in time. Accordingly, the differentiated function derives a point in time referenced to the incoming pulse signal to terminal 20 which is invariant with respect to the amplitude of said pulse signal.

The differentiated waveform is then amplified by amplifier network 22, as shown by Graph C. of FIGURE 4, and is applied to the tunnel diode network threshold detector 23. The tunnel diode 24 is normally biased into its low voltage state and provided with a peak threshold point, slightly negative, on the order of a few milliamperes. When the amplified differentiated waveform exceeds the peak threshold point the tunnel diode fires to its high voltage state and produces at its output a negative going step voltage. It is noted that since the threshold peak point of tunnel diode 54 is only slightly negative and since the slope of the differentiated waveform is very great around the zero crossing point, the threshold is exceeded at a point in time close to the zero crossing point, and the time of thresholding undergoes essentially no change as a function of the input waveform amplitude. This is made clear in Graph C of FIGURE 4.

Upon application of the negative going step voltage to monostable multivibrator 27 an output pulse is generated, such as shown in Graph D of FIGURE 4. This pulse is coupled to flip-flop network 6 and the negative going leading edge, which is referenced to the incoming signal, is employed to trigger that network. The pulse is also coupled through emitter follower network 28 and the positive going lagging edge thereof is conducted through diode 29 for resetting the tunnel diode 24 to its low voltage state so as to respond to a succeeding echo signal.

Referring now to FIGURE 5, there is illustrated a detailed schematic diagram of a clock generator circuit in accordance with the invention. The illustrated circuit is employed in both the coarse and fine clock generator networks 9 and 10 of FIGURE 1, being different in this employment only in the frequency characteristics of the crystals connected in the circuit.

Input terminal 40 is connected through a differentiating network 41, which includes capacitor 42 and resistor 43, to a transistor 44. Transistor 44, significantly, is of a type which exhibits good avalanche properties and is operated in an avalanche mode for generating a step voltage of large magnitude and short rise-time for impulse shocking a piezoelectric crystal 52 so that oscillation thereof commences at essentially maximum amplitude. One end of capacitor 42 is connected to input terminal 40 and the other end is coupled to the base electrode of transistor 44 and through resistor 43 to a source of negative potential 45.

The emitter electrode of transistor 44 is connected directly to source 45 and the collector electrode is connected through a biasing resistor 46 to ground. The collector electrode is further connected through a D.C. blocking capacitor 47 to one side of the primary winding 48 of a broad-band, high frequency response transformer 49, the other side of winding 48 being connected to ground. A damping resistor 50 is connected in parallel with primary winding 48. Transformer 49 has a center tapped secondary winding 51 coupled to a passive crystal oscillating circuit in a balanced configuration, said oscillating circuit including a piezoelectric crystal 52 of a predetermined resonant frequency, resistors 54 and 60 and variable capacitors 55, 59 and 61. The center tap of winding 51 is connected to ground. One end terminal thereof is connected through a diode component 53 poled so as to conduct current away from the end terminal, to one side of the crystal 52. Between the junction of the cathode of diode 53 and said one side of crystal 52 and ground are connected in parallel resistor 54 and variable capacitor 55. The other side of crystal 52 is connected to terminal 56 which is coupled to a following transistor amplifier stage 57, shown in block form. The other end terminal of secondary winding 51 is coupled through a diode component 58, poled to conduct current into said other end terminal, to one side of variable capacitor 59. Between the junction of the anode of diode 58 and said one side of capacitor 59 and ground are connected in parallel resistor 60 and variable capacitor 61. The other side of capacitor 59 is joined to terminal 56. Resistor 60 and capacitor 61 are matched in value to a corresponding resistor 54 and capacitor 55, and capacitor 59 is matched in value to the equivalent shunt capacitance of crystal 52 for balancing out the capacitor charging transient at the terminal 56.

The output of amplifier 57 is connected to a narrow-band filter network 62 shown in block form, which network passes the fundamental frequency of the crystal 52. The output of filter network 62 is connected to an emitter follower stage 63 which serves to provide impedance matching and drives a wave shaping tunnel diode 64. The input to stage 63 is applied to the base electrode of a transistor 65, the emitter electrode thereof being connected through emitter resistor 66 to ground and the collector electrode being connected to a source of positive potential 67. Source 67 is also connected through a variable biasing resistor 68 to the anode electrode of tunnel diode 64, the cathode electrode of said diode being connected to ground. To complete the circuit a series connected current limiting resistor 69 and a D.C. blocking capacitor 70 are coupled between the emitter of transistor 65 and the anode of tunnel diode 64. A first output taken from the anode of tunnel diode 64 is connected as the first input to either of gates 11 or 13, depending on whether the coarse or fine channel is being considered. A second output is taken from the anode of tunnel diode 64 as a first input to coincidence detector network 15.

In the operation of the clock generator circuit illustrated in FIGURE 5 avalanche transistor 44 is normally biased to cut off. Under this condition essentially the entire voltage from voltage source 45 is across the emitter to collector junction of transistor 44, and the collector is at approximately ground potential. There is also essentially zero volts across the primary winding 48. In response to a positive going voltage step from flip-flop network 6, a positive voltage spike is formed at the base electrode of transistor 44 by differentiating network 41 and transistor 44 rapidly conducts in an avalanche mode so that the collector voltage drops sharply. The drop in voltage is appreciable, on the order of 70 volts for a source potential of about 100 volts. This voltage drop appears across the primary winding 48 as a large voltage step, causing current to conduct in the secondary circuit. Accordingly, capacitor 55 charges rapidly at a high value of current to a positive potential, and capacitor 61 charges to a corresponding negative value. Charging of capacitor 55 provides a voltage impulse to crystal 52 causing it to ring at its natural frequency. The time constant of the charging circuit is a small fraction of the period of oscillations and this characteristic in addition to the high voltage to which capacitor 55 is charge causes the crystal to commence ringing at essentially maximum amplitude. Ringing of the crystal 52 produces a sinusoidal voltage at the output which is coupled to the succeeding amplifier stage 57. The symmetrical characteristic of the secondary circuit configuration provides a balancing out in the output waveform of the charge transient of capacitors 55, 59, 61 and crystal 52. The diodes 53 and 58 act to decouple the crystal from the input after the crystal is shocked into oscillation to reduce the attenuation of the alternating output voltage. Accordingly, there is generated a sinusoidal voltage of stable frequency and amplitude that persists as such for an extended time, on the order of a millisecond.

Upon being amplified and filtered, the sinusoidal output voltage from the crystal oscillator circuit is coupled through emitter follower network 63 to the tunnel diode 64, which shapes the sinusoidal function into a rectangular waveform. The tunnel diode 64, in accordance with convention, having a positive peak threshold point of given magnitude, is normally biased slightly below the peak point to be in its low voltage state. In response to the positive going portions of the sinusoidal voltage coupled to its anode, and when the peak point is exceeded, the tunnel diode will switch to its high voltage state. In response to the negative going portions of the sinusoidal voltage, and when the valley point of the tunnel diode is exceeded, the diode will switch back to its low voltage state. Accordingly, the noted shaping of the sinewave from filter network 62 into a rectangular waveform is accomplished.

Typical circuit parameters for the circuit of FIGURE 5, given to particularly describe the invention and not to be construed by way of limitation, are as follows:

| | |
|---|---|
| Capacitor **42** | 300 $\mu\mu$ farads. |
| Capacitor **47** | 500 $\mu\mu$ farads. |
| Capacitor **55** and **61** | 12–18 $\mu\mu$ farads. |
| Capacitor **59** | 2-8 $\mu\mu$ farads. |
| Capacitor **70** | .005 $\mu\mu$ farad. |
| Resistor **43** | 1K ohm. |
| Resistor **46** | 100K ohms. |
| Resistors **54** and **60** | 11K ohms. |
| Resistor **66** | 300 ohms. |
| Resistor **68** | 2.5–3.5K ohms. |
| Resistor **69** | 330 ohms. |
| Diodes **53** and **58** | 2 series connected Type FD100. |
| Crystal **52** | International Type F605. |
| Transistor **44** | Motorola Type 2N2222. |
| Transistor **55** | Fairchild Type 2N917. |
| Tunnel Diode **64** | GE Type TD310A. |
| Source **45** | —100 v. |
| Source **67** | +12 v. |
| Transformer **49** | 5 turns primary, 2×10 turns secondary, nickel zinc ferrite toroidal core. |

In FIGURE 6 is illustrated a detailed schematic diagram of the coincidence detector network 15 of FIGURE 1. A first input terminal 80, which has coupled thereto the rectangular waveform from the wave shaping tunnel diode of the coarse clock generator 9, is coupled through a current limiting resistor 81 and a capacitor 82 to a first pulse generating monostable tunnel diode network 83. Tunnel diode network 83 includes tunnel diode 84, shunt inductor 85 and current limiting resistor 86. Resistor 81 and capacitor 82 are serially connected as recited between terminal 80 and the anode electrode of tunnel diode 84. The cathode electrode of diode 84 is connected to ground. The series connection of inductor 85 and resistor 86 is connected in the order recited in shunt with diode 84 between the anode electrode thereof and ground. Said anode is also coupled through a variable biasing resistor 87 to a source of positive potential 88. The above described circuitry, as will be seen, transforms the rectangular waveform into a succession of narrow pulses referenced in time to said rectangular waveform.

A second input terminal 89, having coupled thereto the rectangular waveform from the wave shaping tunnel diode of fine clock generator 10, is coupled to an identical circuit as above described including current limiting resistor 90, capacitor 91, and a second pulse generating monostable tunnel diode network 92 of tunnel diode 93, shunt inductor 94, resistor 95 and energized by source 88 coupled through variable biasing resistor 96. It may be apprecated that this circuit generates a second succession of narrow pulses from the rectangular waveform applied to terminal 89.

The anode of tunnel diode 84 is connected through a D.C. blocking capacitor 97 and a current limiting resistor 98 to the anode electrode of a phase coincidence detecting tunnel diode 99, the cathode electrode thereof being grounded. Similarly, the anode of tunnel diode 93 is connected by capacitor 100 and resistor 101 to the anode electrode of tunnel diode 99. The anode electrode of diode 99 is further connected through a variable biasing resistor 103 to source 88, and the output of coincidence detector network 15 is taken from said anode electrode.

In the operation of the coincidence detector network 15 it will be assumed that initially only input terminal 80 is energized by a rectangular waveform from coarse clock generator network 9. The tunnel diode 84, having a positive peak threshold point of given magnitude, is normally biased slightly below the peak point to be in its low voltage state. In its low voltage state, tunnel diode 84 together with capacitor 82 forms a differentiating network for differentiating the applied rectangular waveform. Accordingly, in response to the positive going portion of the rectangular waveform, a positive spike instantaneously appears across tunnel diode 84 which exceeds the peak threshold point and triggers the diode into the high voltage state. Inductor 85 cannot instantaneously change its conduction so that a high voltage across diode 84 is briefly maintained until conduction through inductor 85 increases sufficiently to cause the diode current to fall below the valley threshold point and the diode switches back to its low voltage state. A very narrow positive pulse is thereby formed. The diode remains in the low voltage state until application of the succeeding positive going portion of the rectangular waveform. The pulse generated by tunnel diode 84 is couplid to tunnel diode 99 which is normally biased to its low voltage state and has a peak threshold point of a given magnitude, which peak point is greater than the amplitude of the pulses applied thereto when taken singly. Accordingly, with pulses from only tunnel diode network 83 coupled to tunnel diode 99, the diode remains in its low voltage state and no output is provided.

After a period of time terminal 89 is energized by the rectangular waveform from fine clock generator network 10. In the manner above described tunnel diode network 92 generates a train of narrow pulses which are applied to tunnel diode 99. When the pulses from networks 83 and 92 are in phase coincidence they add to exceed the peak threshold point of tunnel diode 99. Diode 99 then switches to its high voltage state, producing a positive going step voltage ouput which is fed back to inhibit gate 13 of FIGURE 1.

Typical circuit parameters for the circuit of FIGURE 6, given to particularly describe the invention and not to be construed by way of limitation, are as follows:

| | | |
|---|---|---|
| Resistors **81** and **90** | ohms | 180 |
| Resistors **86** and **95** | do | 16 |
| Resistors **87** and **96** | do | 1–2K |
| Resistors **98** and **101** | do | 270 |
| Resistor **103** | do | 2.5–3.5K |
| Capacitors **82**, **91**, **97** and **100** | farads | 50$\mu\mu$ |
| Inductors **85** and **94** | nanohenries | 30 |
| Source **88** | v | +12 |

Although application of the illustrated circuit is with respect to measuring target range in a laser ranging system, the circuit can also be readily employed for comparable radar applications. Further, it may be readily recognized that the circuit is basically one for measuring the interval between successive pulses and may therefore have numerous other applications where such time interval measurement of extreme accuracy is required. Further, the detailed disclosure presented, which is made so as to fully and completely describe the invention, is not intended to be limiting and it is recognized that numerous modifications and variations may occur to those skilled in the art which do not exceed the basic teachings set forth herein. Accordingly, the appended claims are meant to embrace any and all modifications which fall within the true scope and spirit of the invention.

What we claim as new and desire to secure by Letters Patent of the United States is:

1. An electrical circuit for generating a high frequency alternating output voltage of constant amplitude and frequency comprising:
   - (a) a transistor operating in an avalanche mode and biased to be normally nonconducting, said transistor rapidly conducting in response to an applied signal to generate an abrupt step voltage of relatively large magnitude,
   - (b) a transformer having a primary winding and a center tapped secondary winding,
   - (c) an oscillating circuit including a piezoelectric crystal of high frequency characteristic,
   - (d) first means for coupling said secondary winding to said oscillating circuit in a balanced configuration for balancing out transient responses at the output of said oscillating circuit, and
   - (e) second means for coupling said step voltage to said primary winding for energizing said secondary winding to thereby impulse shock said crystal, whereby said alternating output voltage is generated.

2. An electrical circuit as in claim 1 wherein said oscillating circuit further includes a first parallel branch of resistance and capacitance coupled between the input terminal of said crystal and the center tap of said secondary winding and a second parallel branch of resistance and capacitance coupled by a further capacitance between the output terminal of said crystal and said center tap, said first parallel branch being of matching characteristics to said second parallel branch and said further capacitance being of matching characteristics to the equivalent shunt capacitance of said crystal.

3. An electrical circuit as in claim 2 wherein said first means includes a pair of unilaterally conducting devices poled so as to permit current flow in a single direction in said secondary winding.

4. An electrical circuit for generating a high frequency alternating output voltage of constant amplitude and frequency comprising:
   - (a) a transistor operating in an avalanche mode and biased to be normally nonconducting, said transistor rapidly conducting in response to an applied signal to generate an abrupt step voltage of relatively large magnitude,
   - (b) an oscillating circuit including a piezoelectric crystal of high frequency characteristics coupled in a balanced configuration for balancing out transient responses at the output of said oscillating circuit, and (c) means for coupling said transistor to said balanced oscillating circuit for impulse shocking said crysal, whereby said alternating output voltage is generated.

References Cited

UNITED STATES PATENTS

| | | | |
|---|---|---|---|
| 2,738,461 | 3/1956 | Burbeck et al. | 324—68 |
| 3,010,076 | 11/1961 | Szerlip | 331—139 |
| 3,024,986 | 3/1962 | Strianese et al. | 324—68 X |
| 3,177,376 | 4/1965 | Wolterman | 307—88.5 |
| 3,193,704 | 7/1965 | Chueh | 307—88.5 |

| | | | |
|---|---|---|---|
| 3,218,465 | 11/1965 | Hovey | 307—88.5 |
| 3,225,212 | 12/1965 | Hilsenrath | 307—88.5 |

OTHER REFERENCES

"Avalanche Transistor Circuits," Technical Report No. 23, University of Illinois Research Under Contract, FIG. 3.

"The Vernier Time Measuring Technique," Proceedings of the IRE, vol. 45, No. 1, January 1957, pages 21–29.

WALTER L. CARLSON, *Primary Examiner.*

P. F. WILLE, *Asistant Examiner.*